March 3, 1964

VLASTIMIR DAVIDOVITCH
NOW BY CHANGE OF NAME
VLASTIMIR DAVIDOVIC
GAS TURBINE CYCLE IMPROVEMENT 3,122,886

Filed Sept. 2, 1958

INVENTOR
VLASTIMIR DAVIDOVITCH
NOW BY CHANGE OF NAME
VLASTIMIR DAVIDOVIC

BY
ATTORNEY

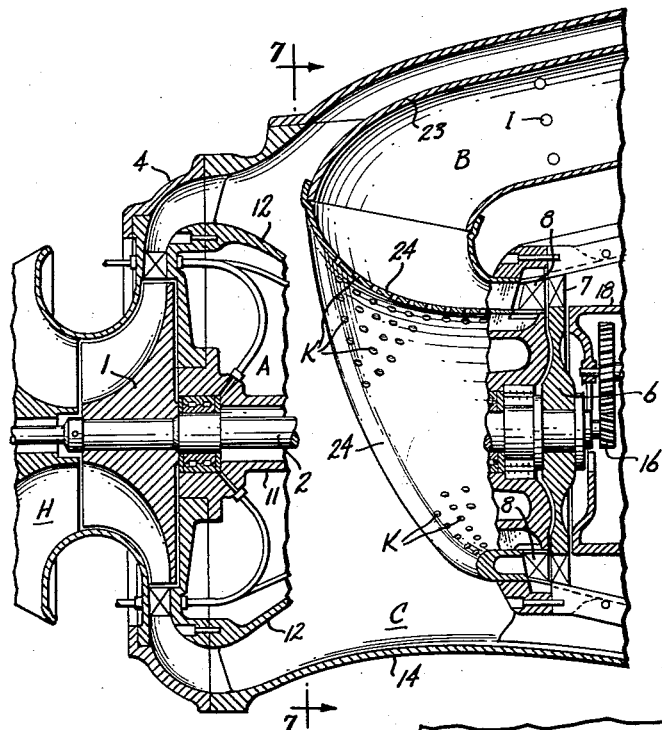
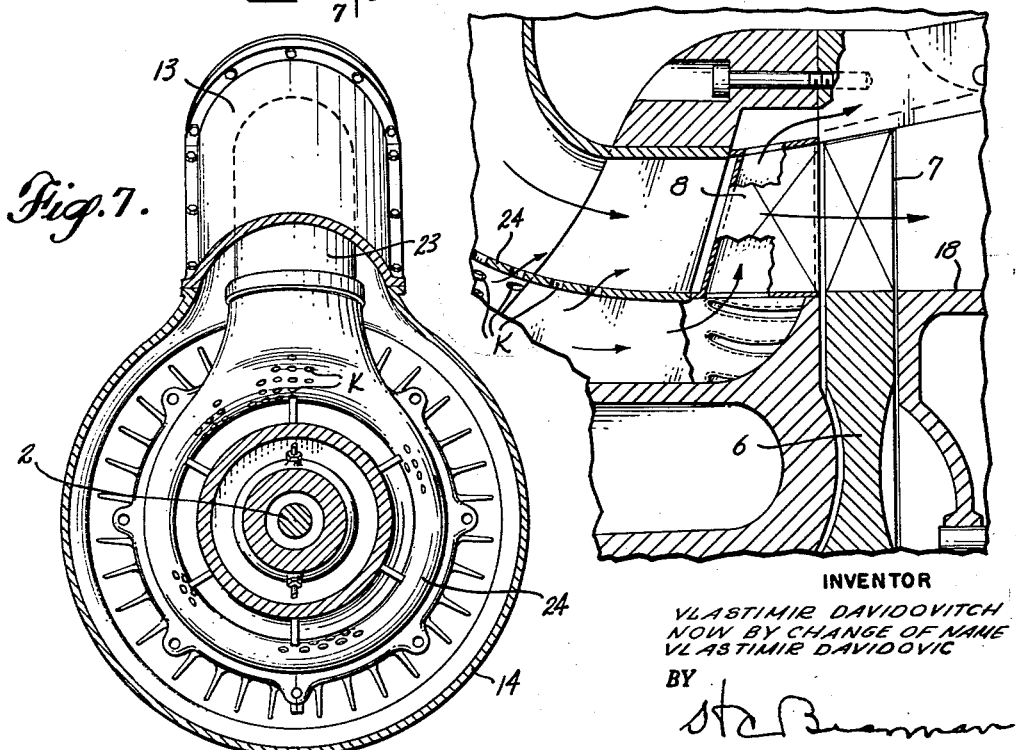

United States Patent Office 3,122,886
Patented Mar. 3, 1964

3,122,886
GAS TURBINE CYCLE IMPROVEMENT
Vlastimir Davidovitch, 1921 12th Ave. S., Seattle, Wash.,
now by change of name Vlastimir Davidovic
Filed Sept. 2, 1958, Ser. No. 758,212
2 Claims. (Cl. 60—39.16)

This invention concerns gas turbine engines or units, characterized by cooling of the turbine, combustion chamber and recuperator by combustion air which, so preheated, recycles absorbed heat back into the process. This application is a continuation-in-part of application Serial No. 345,629, entitled "Heat Regenerator for Gas Turbines," filed March 23, 1953, now abandoned.

The object of the present invention is to provide a gas turbine engine or unit which gives a high thermal efficiency by improvement of gas turbine cycle using simple means.

According to the present invention, a gas turbine engine or unit having at least one flame tube, at least one single or multi-stage turbine and a recuperator is characterized in that combustion air is adapted to be circulated under pressure around said parts to cool same prior to its passing into said flame tube to be mixed with fuel and ignited for combustion purposes. The same air is used for internal cooling of stationary turbine blades or vanes and moving turbine blades, and at the same time for increasing pressure and mass flow for the shaft or power turbine, by provision of adequate perforations on the turbine casing between the compressor turbine and power shaft turbine.

The invention will be described further, by way of example, with reference to the accompanying drawings in which:

FIG. 6 is a fragmentary longitudinal sectional view through the gas turbine similar to a portion of FIGURE 2, but with parts broken away;

FIG. 7 is a transverse sectional view through the turbine taken on line 7—7 of FIGURE 6; and FIG. 8 is an enlarged fragmentary sectional view through a portion of the turbine as seen in FIGURES 2 and 6.

Figure 1:
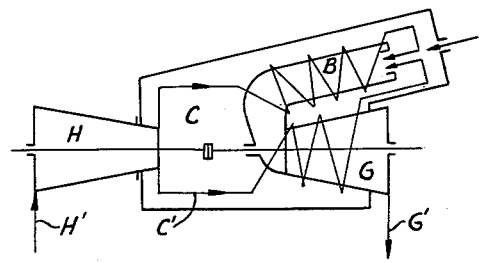
FIG. 1 is a diagrammatic representation of a gas turbine engine or unit showing generally the disposition of parts and the flow of combustion air and combustion gases.

Referring firstly to FIG. 1, the arrangement of the engine or unit comprises a flame tube B, a turbine G, a pressure compartment or vessel C, and a compressor H. Arrow H' indicates the entry for air into the compressor and arrow G' indicates the outflow of combustion gases. the line C' indicates schematically the flow of air within the engine or unit from the compressor H to the entry end of the flame tube B.

Figure 3:
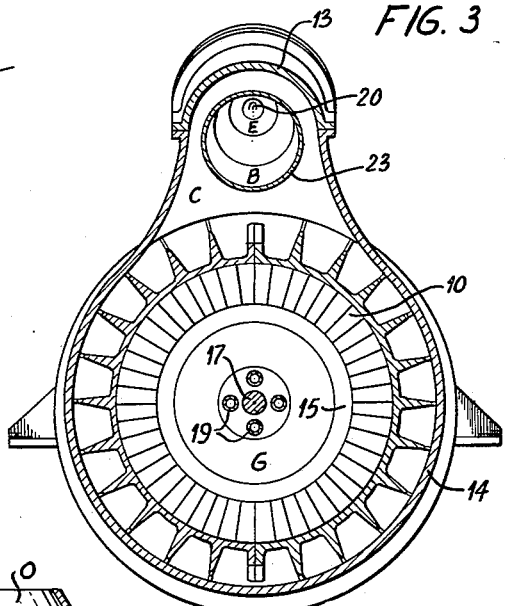
FIG. 3 is a transverse section on the line II—II of the engine illustrated in FIG. 2.
Figure 2:
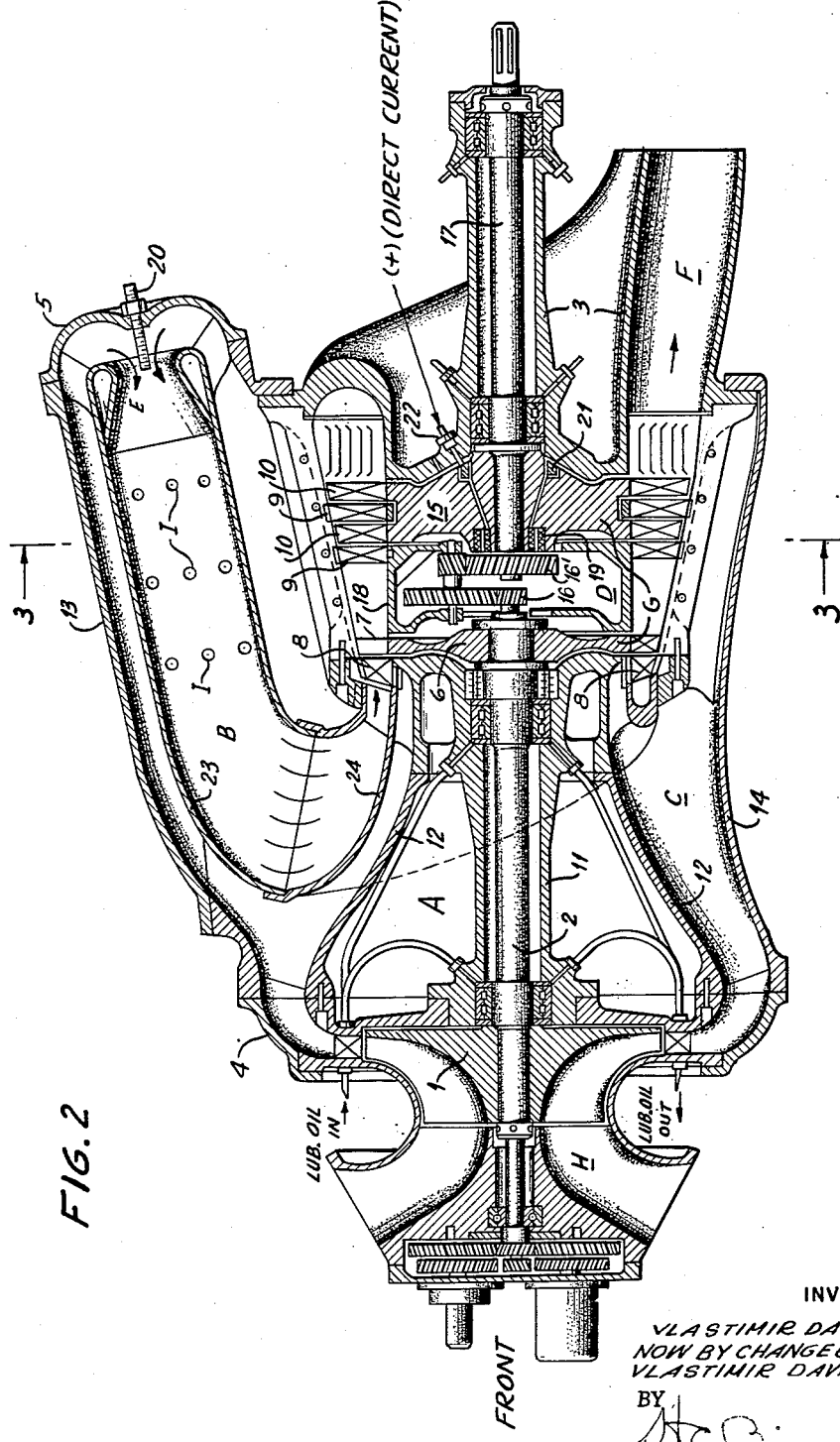
FIG. 2 is an axial section through a gas turbine engine or unit constructed in accordance with the invention.

The gas turbine engine or unit illustrated in FIGS. 2 and 3 it will be seen, consists of two impeller turbines proper G and one flame tube B, both of which are located within a pressure compartment C the major portion of which is in concentric relationship with the turbine G.

The pressure compartment C, serves to provide a passage for compressed air from a compressor H, to the flame tube B, said compartment is formed by an annular cover 4, the wall of the vessel 14, the wall of the combustion chamber cover 13 and a circular end cover 5. The front opening of the vessel C is covered by the stator of the compressor H and the rear opening is covered by the rear end cover 3 of the turbine G. Within the vessel C is fitted a coolant or fuel container A, the casing of the turbine G and the flame tube B, so that the space between outer walls of casing 13 and 14 of the engine and the inner space occupied by the parts of the engine to be referred to, represent a passage for compressed air flowing from the compressor H to the flame tube B.

An exhaust jet pipe F formed in the rear end cover 3 of the turbine G leads exhaust gas into the atmosphere.

The flame tube B is located in an inlined portion of a smaller cylinder which toward the front end merges into the cylindrical form of the pressure compartment C as may be seen in FIG. 3. The combustion chamber is of the reversed flow type, and consists, in effect of two parts one external shell contains a burner 20 and an internal part, flame tube B with its end remote from the burner. This part is cylindrical and is curved to fit into the second part which merges into ringshaped form and leads combustion gases at the full circumference to the turbine G. Between the wall 23 of the flame tube B and the vessel walls 5, 13 and 14 adequate space is provided to allow flow of compressed air to the interior of the flame tube B through a primary air inlet E within which is located the burner 20. The two impeller turbines G are located at the ringshaped outlet throat of the second part of the flame tube B.

The turbine nearer the throat of the flame tube will hereinafter be called the "Compressor or gas producing turbine" and this turbine is mounted upon a shaft 2 which carries the compressor rotor 1 of a centrifugal compressor. Secured to the wall of the air compressor is an annular cover 4 which serves to close the space between the flange of the vessel wall 14 and the stator of the compressor H. The annular cover 4 is, of course, also secured to the wall 14.

The second turbine, that is the one remote from the throat of the combustion chamber, drives an output shaft 17 enclosed by a sleeve 3. The turbine will hereinafter be called the "Power Turbine." It will be seen that the power turbine is located within the same casing as the compressor or gas producing turbine.

Within the pressure compartment is a coolant container A located between the casing of the compressor turbine and the compressor H. The coolant container A occupies the space between the rear portion of the compressor stator, the compressor turbine wall, a sleeve 11 of the compressor turbine shaft 2 and a wall 12 which separates the coolant container from the pressure compartment C.

Having described the arrangement in general, it will now be described in greater detail.

The pressure compartment C which, as previously described, is defined by the volume enclosed by the common annular cover 4, the casing 14 of the engine, the cover 13 of the combustion chamber, the circular end cover 5 of the combustion chamber, and the rear end cover 3 of the turbine G and is of such shape that when viewed in longitudinal elevation, the lower part of the compartment C enclosed a larger volume than the upper part. The lower part of the vessel C contains, as described, the coolant container A, flame tube outlet throat, limited by walls 24, and the casing enclosing turbine G. The upper portion of the vessel C enclosed the cylindrical first part of the flame tube B and serves to lead compressed air from the compressor H to the interior of the flame tube B through the primary air inlet E.

The first part of the flame tube B is as described above, of cylindrical form over the major portion of its length and is provided with a bend at its end remote from the burner 20 so that it can be inserted into the specially formed outlet throat of the second part of the flame tube B which is flattened and shaped into an aerodynamical form, as defined by the walls 24. The second part of the flame tube B alters in cross-section to an annular form which is divided radially by partitions in the form of hollow blades 8, which latter are provided to allow combustion air to circulate around the compressor turbine prior to entering the flame tube B. Sleeve 11 of the compressor turbine shaft is extended so as to form the front cover of the turbines G. Between the walls 12 of the coolant container A and the wall 24 of the outlet throat of the combustion chamber there is thus provided an annular space which serves to allow the circulating of compressed air to effect external cooling of combustion gases and thus determine the desired turbine inlet temperature, the same air passes through the hollow vanes 8 of the compressor turbine and in this way maintains desired temperature of their walls as aforesaid.

The walls 23 of the flame tube B are provided with a number of adequately sized and spaced holes I which serve as secondary air inlets and on the wall 24 of the flame tube outlet throat, a number of tiny holes K are provided which serve as pressure equalizing orifices so that the air pressure in the vessel C and in the inside of the combustion chamber remains the same. Those holes K at the same time serve for reducing of secondary air quantity by controlling the turbine inlet temperature by mixing of a small quantity of relatively colder air with combustion gases.

The burner 20 is built in the circular end cover 5 of the compartment C and is so mounted that its axis coincides with the axis of symmetry of the flame tube B and, of course, concentrically located relative to the primary air inlet E.

Adjacent the hollow blades 8 which are fixed, are the moving blades 7 of the compressor turbine disc or impeller. The power turbine is of the two-stage type and consists of two rows of fixed blades 9 and two rows of moving blades 10 the latter being mounted on a turbine disc or impeller 15 which is mounted on a shaft 17 enclosed in a sleeve 3 which forms part of the rear cover of the engine. The sleeve 3 of the rear cover of the engine is flanged to have a diameter equal to that of the disc 15 of the power turbine and the periphery of the flange is axially extended to form on the upper portion a curve which is axially longer as the sections are lower so that it terminates as a segmental opening which forms an exhaust jet pipe F.

A quantity of compressed air enters into the interior of the flame tube outlet throat through the pressure equalizing orifices K in order to offset the eventual pressure drop before the combustion gases enter into the turbine. This quantity of relatively colder air than combustion gases also controls the turbine inlet end and diminishes secondary air quantity normally required.

The coolant container A, as previously described, serves for cooling of compressor impeller, disc and bearings of the compressor turbine and conveniently tubes for lubricating oil, pass through the container.

Between the compressor and power turbines, and enclosed by walls 18 is located a power turbine synchronizing gear box D provided with an electromagnetic clutch. Within the gear box are two pinions 16 and 16', the former fast on the compressor driving turbine shaft, and the latter loose on the power turbine shaft. Two interconnected gears mesh respectively with the pinions 16 and 16' and serve to mechanically interconnect the compressor turbine and the power turbine at a predetermined speed ratio to prevent overspeeding of the power turbine which may result in its explosion, or to stop the compressor driving turbine if the power turbine should stall, to prevent burning of the power turbine blades which might result from the inability of the power turbine to absorb energy from the hot combustion gases. Electromagnets 19 are located in the power turbine disc 15 and have their negative poles connected to the material of the disc. All the positive poles are connected to an insulated slip ring 21 which is also located in the power turbine disc. An insulated brush 22 is provided in the engine and cover and has a switch connected to the positive pole of a battery (not shown) whose negative pole is connected to the engine casing. The gear 16' which is free to rotate on the power turbine shaft will be coupled with the power turbine disc 15 and shaft 17 by the electromagnets when they are energized by closing the circuit so that the gears will couple the compressor turbine and the power turbine.

A power turbine synchronizing device enables the compressor driving turbine to supplement the power turbine momentarily for providing increased torque on the output shaft 17 at low speeds, especially for engines intended for transport duties, in for example automobiles, freight vehicles and the like.

In operation atmospheric air is drawn into the compressor H and is compressed prior to entering the compartment C, wherein it serves to have a cooling effect all around the flame tube B, and the outer casing as well as internal cooling of the turbines G and recuperator (not shown). A portion of the air stream flowing between the coolant container wall 12 and the wall 24 of the flame tube outlet throat passes through the hollow fixed blades 8 and rejoins the rest of the air stream in the compartment C. The manner in which the combustion gases pass from the flame tube B between the stationary blades 8 and the rotary blades 7 of the compressor driving turbine is shown somewhat more clearly in the detail view of FIGURE 8. Part of the air flowing through the annulus of the combustion gas manifold passes through the holes K of such manifold as explained previously, and the rest of such air flowing into the manifold passes through the hollow stationary blades 8 of the compressor turbine, as shown best in FIGURE 8. When a recuperator is attached to the pressure compartment the compressed air is pre-heated by exhaust gases. After the air has circulated, so called primary air enters the flame tube B through the primary air inlet E where it mixes with a finely atomized spray of continuously injected fuel, thus forming a combustible mixture which is spark-ignited. Some of the pre-heated compressed air (so-called secondary air) enters in counterflow (better mixing) the flame tube B through secondary air inlets I to effect complete combustion.

As the maintaining of the turbine inlet temperature at a desirable value (T maximum) is achieved by external and internal cooling of the flame tube outlet throat and fixed hollow blades 8, of the compressor turbine, the secondary air quantity will be much lower than is normally expected and thus the thermal efficiency of the unit will be improved as well as stability of flame in case of sudden change of output.

Combustion takes place at a constant pressure within the flame tube and the products of combustion are directed and expended through fixed blades 8 with a consequent heat-drop before admittance to the moving blades 7 of the compressor turbine, where the heat-drop is converted into mechanical energy. A percentage of the heat-drop is converted into mechanical energy in the one stage compressor turbine and is used for driving the rotor 1 of the air compressor H. The rest of the heat-drop is converted into mechanical energy in the two stage power turbine the power output of which is the effective or brake horse power of the engine.

The residual hot low pressure gases which still contain some heat energy are exhausted through the jet exhaust pipe F into the atmosphere in order to liberate the remaining energy in form of thrust (turbo prop).

Figure 4:
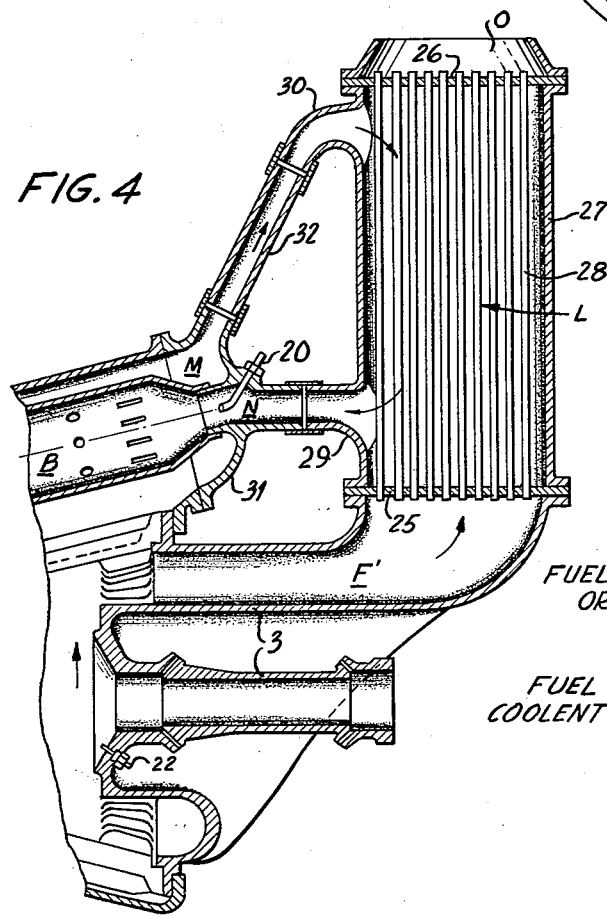
FIG. 4 is a sectional view of part of the engine of FIGS. 2 and 3 showing a modification.

Referring now to FIG. 4 which shows a section of part of the engine just described, together with a modification it will be seen that a recuperator has been included in the engine. This arrangement is intended for marine units, where space requirement is of secondary importance.

The modification consists of providing a passage M in the circular end cover 5 of the compartment C and securing to the passage a pipe 32 which is secured also to an inlet 30 of the recuperator L. The recuperator L is tubular and has a circular outer wall 27. At each end of the circular wall 27 end plates are provided, there being one end plate 26 adjacent the inlet and one end plate 25 adjacent the outlet. Secured between the end plate and passing through the apertures therein are a plurality of recuperator tubes 28.

Recuperator L is bolted to the exhaust duct F' which serves to replace the jet exhaust pipe F of the engine just described, and intermediate the ends of the walls 27 of the recuperator is a passage N which serves to conduct compressed air, which passes through the recuperator, outside the recuperator tubes 28, to the primary air inlet E of the flame tube B. Hot exhaust gases flow from the engine through the tubes 28 after passing through the outlet tube F' and thus the compressed air is pre-heated prior to entering the flame tube B. The hot exhaust gases pass from the tubes 28 through the exhaust port O to atmosphere.

It will be evident that the recuperator can be located in any convenient position relative to the engine casing and need not be located in the position illustrated. It can be located in the interior or pressure compartment or vessel. This arrangement relates to the uses where space requirements are limited. In this case recuperator is a cross flow type.

The principal advantage of the engines or units just described lies in the fact that the thermal efficiency is increased due to the following factors.

Cooling of the turbine body, flame tube and first row of fixed vanes of the compressor turbine by compressed air thus permitting use of higher turbine inlet temperatures.

Adding an extension of the turbines casing after the last row of blades of power turbine and providing it with external as well as with internal ribs in order to increase the heat exchange surface area and recycle the heat of exhaust gases.

Utilizing would-be radiation losses of the combustion chamber turbine casing and the heat absorbed by cooling the first row of fixed vanes and recycling the air so pre-heated for use as combustion air.

Efficient cooling due to the large quantity of relatively cool air passing at a considerable velocity all around the flame tube, the turbine casing and through first row of hollow fixed blades.

Efficient cooling due to the fact that the cooling is performed at the working pressure of the unit, consequently compressor power requirement is lower and the whole cycle more concentrated.

The fact that the compressor is delivering the quantity of compressed air required for combustion, plus secondary air quantity lower than ever achieved in today's gas turbine cycles.

External and internal cooling of the engine parts so that the percentage of secondary air will be considerably lower than that normally required.

The compact form of the unit provided with short large volume air and gas passages, united with the desired deceleration of the air at the primary air inlet thus ensuring that friction losses are reduced.

The provision of pressure equalizing orifices in order to ensure that the parasitic pressure drop is small. Those orifices in the same time serve for control of permissible turbine inlet temperature, by direct mixing of relatively colder air from pressure compartment with combustion gases downstream of combustion zone.

The provision of an exhaust jet pipe when the engine or unit is used for fast moving apparatuses thereby adding the thrust to the output of the unit.

Cooling of the rear wall of compressor and compressor turbine disc by means of coolant circulated through the coolant container, and ensuring that when the fuel is used as a coolant the heat absorbed by cooling is recycled.

The use of combustion air for reducing the wall temperature permits the use of high turbine inlet temperatures; and at the same time the quantity of secondary air is reduced, thus reducing the ratio of air to fuel. Because of reduced air requirement the size and power demand of the air compressor is reduced. Since the essential parts are enclosed in a pressure compartment designed to withstand explosions, individuals are protected against injury hazards. The perforations in the combustion tube serve as pressure equalizing orifices eliminating pressure drop through the combustion chamber. Internal and external cooling is achieved without additional air or rotating parts, and such cooling is automatic with operation of the cycle. Thermal expansion of various parts is controlled by the forced continuous cooling, and the expansion is brought into desirable valves by the division into zones. Using the fuel as coolant not only preheats it but also maintains desired temperatures in the adjacent elements.

The above description serves to illustrate only two examples in which the principle of the invention may be used, but the same principle may also be applied to other kinds of gas turbine units. For example the invention is applicable to a gas turbine unit which may have a plurality of combustion chambers and a single or multi-stage turbine with or without use of a recuperator, not only of counter-flow but also of parallel or cross-flow type, operating not only on an open simple and recycle process, as described above, but also on a semi-closed or closed cycle, utilizing different kinds of compressed air sources and several types of fuel.

The flame tubes can be built with a pressure vessel in several different ways. For example, they may be located concentrically and either individually or in combination around the axis of the turbine unit.

Figure 5:
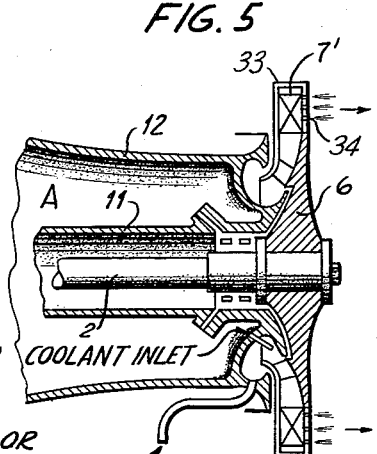
FIG. 5 is a detail view showing the reheat between the compressor and power turbines obtained by cooling of compressor turbine disk and blades.

A further modification, shown in FIG. 5, uses fuel as the coolant in container A. Such fuel passes through a small inlet tube from the container to the adjacent side of the turbine disc 6. This fuel first cools such disc side and then passes outward into the hollow blades 7' of the compressor turbine. A shroud 33 prevents the moving blades from discharging the fuel radially outward from the turbine by centrifugal force, and the fuel will escape through horizontally drilled fine apertures 34 in the downstream edges of the hollow compressor turbine blades which face the power turbine. This fuel discharged from such apertures will be ignited by the combustion gases flowing through the duct 18 between the compressor turbine and the power turbine, and the combustion of such fuel will raise the temperature of the combustion gas and thus improve the operation of the power turbine.

A still further modification can be achieved by connecting the pressure vessel interior to the clearance between the stages of the power turbine by fine holes and in this way achieve double gain, namely the cooling of fixed vanes of the power turbine, and the raising of the pressure, temperature and mass flow between stages.

I claim:

1. A gas turbine engine comprising an air compressor, a first turbine located rearwardly of said air compressor and including hollow stationary blades and a rotor connected to drive said compressor and having rotating blades downstream from said stationary blades, a power turbine rearwardly of said first turbine, a casing enclosing said turbines, a flame tube alongside said casing and having an air inlet located adjacent to said power turbine and its discharge located forwardly of said air inlet and in communication with said first turbine for flow of combustion gas therefrom to said first turbine and then to said power turbine to drive said turbines, conduit means connecting the discharge of said air compressor and said flame tube air inlet, said conduit means communicating with the interior of said hollow stationary blades and including a portion between said flame tube and said casing, said casing having fins projecting therefrom to facilitate heat transfer from combustion gas flowing through said turbines to air flowing through said conduit means, and a container of liquid coolant fuel for the gas turbine engine disposed next to said conduit means between said compressor and said flame tube, for flow of compressed air from said compressor over said coolant container to cool such compressed air, through said hollow stationary blades and past said casing to cool said turbines and reheat such compressed air and into said flame tube air inlet.

2. A gas turbine engine comprising an air compressor, a first turbine located rearwardly of said air compressor and including hollow stationary blades and a rotor connected to drive said compressor and having rotating blades downstream from said said stationary blades, a power turbine rearwardly of said first turbine, a casing enclosing said turbines and including a heat exchanger downstream from said power turbine, a flame tube alongside said casing and having an air inlet located adjacent to said heat exchanger and its discharge located forwardly of said air inlet and in communication with said first turbine for flow of combustion gas therefrom to said first turbine and then to said power turbine to drive said turbines, conduit means connecting the discharge of said air compressor and said flame tube air inlet, said conduit means communicating with the interior of said hollow stationary blades and including a portion between said flame tube and said casing, said casing having fins projecting therefrom to facilitate heat transfer from combustion gas flowing through said turbines to air flowing through said conduit means, and a container of liquid coolant fuel for the gas turbine engine disposed next to said conduit means between said compressor and said flame tube, for flow of compressed air from said compressor over said coolant container to cool such compressed air, through said hollow stationary blades, past said casing to cool said turbines and reheat such compressed air, through said heat exchanger and into said flame tube air inlet.

References Cited in the file of this patent

UNITED STATES PATENTS

| | | |
|---|---|---|
| 2,162,956 | Lyshom | June 20, 1939 |
| 2,399,046 | Larrecq | Apr. 23, 1946 |
| 2,445,973 | Sawyer | July 27, 1948 |
| 2,482,791 | Nettal et al. | Sept. 27, 1949 |
| 2,563,270 | Price | Aug. 7, 1951 |
| 2,588,532 | Johnson | Mar. 11, 1952 |
| 2,591,540 | Grylls | Apr. 1, 1952 |
| 2,595,505 | Bachle | May 6, 1952 |
| 2,611,242 | Bell | Sept. 23, 1952 |
| 2,625,793 | Mierley et al. | Jan. 20, 1953 |
| 2,625,794 | Williams et al. | Jan. 20, 1953 |
| 2,636,344 | Heath | Apr. 28, 1953 |
| 2,676,458 | Hill | Apr. 27, 1954 |
| 2,694,291 | Rosengart | Nov. 16, 1954 |
| 2,793,496 | Mortimer | May 28, 1957 |
| 2,795,928 | Huebner et al. | June 18, 1957 |
| 2,922,278 | Szydlowski | Jan. 26, 1960 |

FOREIGN PATENTS

| | | |
|---|---|---|
| 288,547 | Switzerland | Sept. 1, 1953 |
| 689,353 | Great Britain | Mar. 25, 1953 |
| 695,891 | Great Britain | Aug. 19, 1953 |